(12) United States Patent
Takaya et al.

(10) Patent No.: US 7,402,337 B2
(45) Date of Patent: *Jul. 22, 2008

(54) METHOD FOR MANUFACTURING SPHERICAL CERAMIC POWDER

(75) Inventors: Minoru Takaya, Tokyo (JP); Yoshiaki Akachi, Tokyo (JP); Tomohiro Sogabe, Tokyo (JP); Hisashi Kobuke, Tokyo (JP)

(73) Assignee: TDK Corporation, Tokyo (JP)

( * ) Notice: Subject to any disclaimer, the term of this patent is extended or adjusted under 35 U.S.C. 154(b) by 503 days.

This patent is subject to a terminal disclaimer.

(21) Appl. No.: 10/158,398

(22) Filed: May 29, 2002

(65) Prior Publication Data

US 2002/0193236 A1    Dec. 19, 2002

(30) Foreign Application Priority Data

May 30, 2001    (JP)    ............................. 2001-163524

(51) Int. Cl.
    *C04B 35/26*    (2006.01)
(52) U.S. Cl. ...................................... 428/403; 428/404
(58) Field of Classification Search ................. 501/126, 501/139, 137, 134; 428/313, 315, 318, 323, 428/325, 328, 329, 331, 403–404, 407, 598
    See application file for complete search history.

(56) References Cited

U.S. PATENT DOCUMENTS

| | | | |
|---|---|---|---|
| 3,881,911 A | 5/1975 | Cheney et al. | |
| 5,205,928 A | 4/1993 | Inoue et al. | |
| 5,252,632 A | 10/1993 | Savin et al. | |
| 5,731,085 A * | 3/1998 | Hakata et al. | ................ 428/402 |
| 2002/0193236 A1 * | 12/2002 | Takaya et al. | ................ 501/126 |

FOREIGN PATENT DOCUMENTS

| | | |
|---|---|---|
| DE | 3912379 | 10/1989 |
| DE | 4118752 | 12/1992 |
| JP | 61-236649 | 10/1986 |
| JP | 62-206445 | 9/1987 |
| JP | 62-230607 | 10/1987 |

(Continued)

OTHER PUBLICATIONS

European Office Action for corresponding European application No. 02 011 602.6-2111 lists the references above.

(Continued)

*Primary Examiner*—Carlos Lopez
(74) *Attorney, Agent, or Firm*—Hogan & Hartson LLP (57) ABSTRACT

A method for manufacturing spherical ceramic powder is provided. The method includes essentially a spray drying step and a sintering step. In the spray drying step, a spray nozzle is used to spray slurry containing powdered raw material consisting essentially of ceramic ingredients to form liquid droplets, and liquid contents in the liquid droplets are heated and removed to obtain ceramic granular powder. In the sintering step, the ceramic granular powder is sintered to form spherical ceramic powder. The method provides ceramic powder having a mean particle size of about 1-50 μm and a sphericity of about 0.8 or higher, which is suited for mixing with resin material to form a compound. The ceramic powder has high dispersant and filling properties against the resin material.

13 Claims, 3 Drawing Sheets

FOREIGN PATENT DOCUMENTS

| | | |
|---|---|---|
| JP | 63-274647 | 11/1988 |
| JP | 04-154869 | 5/1992 |
| JP | 05-105502 | 4/1993 |
| JP | 05-262557 | 10/1993 |
| JP | 06-064924 | 3/1994 |
| JP | 06-171944 | 6/1994 |
| JP | 06-263529 | 9/1994 |
| JP | 08-048560 | 2/1996 |
| JP | 08-237836 | 9/1996 |
| JP | 08-268762 | 10/1996 |
| JP | 09-255516 | 9/1997 |
| JP | 11-106560 | 4/1999 |
| JP | 11-209106 | 8/1999 |
| JP | 2000-107585 | 4/2000 |
| JP | 2001-010867 | 1/2001 |

OTHER PUBLICATIONS

US/Energy-Advanced/Materials/Product_Info/ . . . Aug. 16, 2007, Product Catalog—Energy and Advanced Materials, 3M TM Glass Bubbles S60/10000. Annex 2. Nos. 1-10.

* cited by examiner

METHOD FOR MANUFACTURING SPHERICAL CERAMIC POWDER

BACKGROUND OF THE INVENTION

1. Field of the Invention

The present invention relates to a method for manufacturing ceramic powder, and ceramic powder and composite material.

2. Description of Related Art

Fine ceramic powder can be obtained by mixing raw materials, calcinating the mixed raw materials after drying, and crushing them with a crusher like a ball mill or the like. Then, after drying the resultant substance with a spray drier, the substance is processed through a crusher such as a pneumatic crusher to obtain ceramic fine powder.

While these ceramic powders can be used on its own, they are also used as composite material dispersed within resin materials. The requirements for ceramic powders to be used as composite materials are that the powders must have dispersant and filler properties against resin materials. The particle size of particles composed of the powder is one of the factors for securing dispersant and filler properties against resin materials. For example, in addition to the method explained above, ceramic powder can be manufactured from liquid phase state like the co-precipitation method. However, the particle sizes of these powders are so small that it is impossible to secure the dispersing and filler properties against resin materials. Also, the particles in ceramic powder obtained under the method described above come in irregular shape because they are obtained through pulverizing. Thus, the dispersant and filler properties required for resin materials cannot be secured under this method.

Several techniques for manufacturing spherical shaped ceramic powder have been proposed in the past. In one of the conventional techniques, inorganic powder suspended in a flammable gas is sprayed into burning flames to heat and form the inorganic powder into spherical particles. In this method, the inorganic powder is sprayed at a spray speed of 70 to 1,200 m/sec from the tip of the burner nozzle. In one practical example using this technique, silica ($SiO_2$) powder having a mean particle size of 0.5-30 μm can be obtained.

By another technique, a proper binder is kneaded with ceramics having biological absorbability to prepare a slurry and this slurry is dripped on a high temperature heating body. The slurry is dried on the high temperature heating body while being formed into a spherical shape and subsequently sintered at high temperature to obtain spherical ceramics.

In another technique, ceramic fine formed spherical particles are produced through forming ceramic powder obtained by a stirring granulation method. When such particles are produced, granules of ceramic powder obtained by a spray drying method are used as nuclei.

The techniques explained above entail some difficulties. For example, in the first technique that uses flammable gas, it is difficult to control the environment and temperature because flammable gas is directly sprayed (on the material). Because of this, it would be difficult to obtain ceramic powder with multiple ingredients like composite oxides.

In the second technique in which slurry is dripped on a high temperature heating body, although obtained powder particles are generally spherical, they are large in diameters ranging from 0.3 to 1.2 mm (300 to 1,200 μm), which are unsuitable for being used as composite material with resin.

The third technique is aimed at providing particles with particle sizes ranging from 0.02 to 0.4 mm (20 to 400 μm), which are also unsuitable to be used as composite material with resin material.

One prior art describes an injection mold material containing binder resin and spherical ceramic powder with a mean particle size of less than 7 μm, without teaching any specific methods for obtaining such spherical ceramic powder.

As noted above, it was difficult by the conventional methods to obtain powder with spherical particles having appropriate particle sizes for creating composite materials with resin.

Notably, no method has yet been devised to obtain multi-ingredient ceramics of the composite oxide type.

SUMMARY OF THE INVENTION

The present invention provides spherical ceramic particle powder with particle sizes suitable for being dispersed in resin material and with excellent dispersant and filler properties against resin. The present invention also provides a method for manufacturing such spherical ceramic powder. Moreover, the present invention provides a composite material comprising such spherical ceramic powder and resin.

The inventors of the present invention conducted studies to obtain powder suitable to form a composite material with resin by forming granular powder with a spray dry method and by sintering the formed granular powder. And, because small diameter granular powder can be obtained if a spray nozzle is used in the spray dry method, the inventor discovered that powder with particle sizes suitable for being dispersed in resin material and with a high sphericity can be obtained through a subsequent sintering step.

And, when this spray drying method is used, ceramic powder with multiple ingredients can be easily obtained. Moreover, by using fine powder with a high sphericity according to the present invention, the characteristics inherent in this fine powder are effectively exerted through the enhancement of filler properties of the resin material in the composite material. Also, the enhancement of filler properties is effective in securing mechanical strength of the composite material. Moreover, because the spray drying method is used, reliability of products can be secured because large particle powder like crushed powder are hardly ever mixed into the powder.

The present invention has been made based on the discoveries explained above. In accordance with an embodiment of the present invention, a method for manufacturing spherical ceramic powder includes a spray drying step to obtain ceramic granular powder by using a spray nozzle to spray slurry containing powdered raw material consisting essentially of ceramic ingredients to form liquid droplets and by drying the liquid contents, and a sintering step for sintering the ceramic granular powder.

In the method for manufacturing spherical shaped ceramic powder, the powdered raw material may consist of a compound similar to the spherical shaped ceramic powder that has being processed through the sintering step. In other words, the present invention allows using a compound similar to the ceramic powder to be ultimately obtained as the powdered raw material. Also, in the method for manufacturing spherical ceramic powder, in accordance with another embodiment of the present invention, the powdered raw material may consist of a mixture of more than one type of ceramic powder. In other words, the present invention accommodates multi-ingredient ceramic powder using a mixture of more than one type of ceramic powder as the raw material.

In accordance with the present invention, there is provided spherical shaped ceramic powder composed of dielectric material consisting essentially of composite oxide. Also, it is possible to obtain spherical ceramic powder composed of magnetic ferrite material consisting essentially of composite oxide.

With the manufacturing method in accordance with the present invention describe above, spherical shaped ceramic powder with a mean particle size of about 1 to 50 μm can be obtained. The particle size of the spherical powder obtained through this invention may be controlled on the basis of the particle size of primary particles that comprise the ceramic granular powder. In order to obtain a particle size suitable for forming composites with resin material, the mean particle size of primary particles comprising the ceramic granular powder may preferably be 1 μm or less.

With the manufacturing method of the present invention described above, the following novel spherical shaped ceramic powder can be provided. That is, the spherical ceramic powder of the present invention is a composite powder obtained through sintering more than one type of ceramic ingredients, and the mean particle size of the spherical shaped ceramic powder is between about 1 and 50 μm with a sphericity being 0.8 or higher.

Oxide magnetic material or oxide dielectric material may be selected as the material for the spherical shaped ceramic powder, in accordance with the present invention. Conventionally, no ceramic powder with such multiple ingredients as oxide magnetic material or oxide dielectric material, featuring a mean particle size of about 1 to 50 μm or a sphericity of 0.8 or greater or even 0.9 or greater, has been available. In the spherical ceramic powder in accordance with the present invention, a mean particle size may preferably be between 5 and 20 μm.

The present invention provides a composite material including oxide spherical shape powder composed of magnetic or dielectric material and a binder resin that has the oxide spherical powder dispersed and retained within, wherein the oxide spherical shape powder consists of particles with a mean particle size of about 1 to 50 μm and a sphericity of 0.8 or higher. The composite material may preferably contain the oxide spherical shaped powder within the range of about 30 to 98 wt %, and may preferably exhibit a sphericity of 0.9 or higher.

Other features and advantages of the invention will be apparent from the following detailed description, taken in conjunction with the accompanying drawings that illustrate, by way of example, various features of embodiments of the invention.

EMBODIMENTS OF THE PRESENT INVENTION

The following is an explanation of embodiments of the present invention. A method for manufacturing spherical shape ceramic powder in accordance with an embodiment of the present invention includes at least a spray drying process for obtaining ceramic granular powder by forming liquid droplets from a slurry of powdered raw materials comprising of ceramic ingredients with a spray nozzle, and a sintering process for obtaining spherical ceramic powder by sintering the ceramic granular powder.

The ceramic ingredients in the embodiment of the present invention encompass such compounds as oxides, nitrides and carbides that could be recognized as ceramics. They also encompass not only single unit ceramics but also compounds of more than one ceramic, and composite compounds such as composite oxides and composite nitrides. As specific examples of ceramic ingredients, dielectric materials and magnetic materials can be listed.

Examples of dielectric materials include: barium titanate-neodymium ceramics, barium titanate-tin ceramics, lead-calcium ceramics, titanium dioxide ceramics, barium titanate ceramics, lead titanate ceramics, strontium titanate ceramics, calcium titanate ceramics, bismuth titanate ceramics, and magnesium titanate ceramics. Other include $CaWO_4$ ceramics, $Ba(Mg, Nb)O_3$ ceramics, $Ba(Mg, Ta)O_3$ ceramics, $Ba(Co, Mg, Nb)O_3$ ceramics and $Ba(Co, Mg, Ta)O_3$ ceramics. These can be used alone or in mixture form of two or more types. Also, titanium dioxide ceramics include those that consist of a composition of titanium dioxide ($TiO_2$) only or titanium dioxide with small amount of additives. They mean that the crystal structures contain titanium dioxide as the main ingredient. The same can be said of other ceramics. Also, while titanium diode is a substance that is represented as $TiO_2$ and contains several types of crystallized structure substances, the one used as dielectric ceramic has a rutile structure.

As the magnetic material, composite oxides with magnetic properties are used. For example, these will include Mn—Zn type ferrite, Ni—Zn type ferrite, Mn—Mg—Zn type ferrite and Ni—Cu—Zn type ferrite. It could also be iron oxides that include $Fe_2O_3$, $Fe_3O_4$, or the like.

In this invention, powdered raw materials consisting of ceramic ingredients encompass various types of powder comprising particles such as powder, granular powder and pulverized powder. The particle size of powdered raw material determines the particle size of the ultimate powder obtained. In order to achieve the objective of the present invention, the particle size may preferably be 3 μm or less, and more preferably 1 μm or less. Methods of obtaining the powdered raw material are not limited to any specific method.

Slurry is prepared such that the powdered raw material can be sprayed from a spray nozzle. The slurry is prepared by adding a proper amount of powdered raw material to a solvent and mixing it with a mixer such as a ball mill. While the solvent may be water, a dispersant may be added to the solvent to enhance the dispersing properties of the raw material. Binding agent such as polyvinyl alcohol (PVA) may be added to mechanically bind the powdered raw materials.

In the spray drying process of the present invention, liquid droplets are formed by spraying through a spray nozzle the slurry containing powdered raw material consisting of ceramic ingredients. The spray nozzle is used for spraying the slurry and compressed gas. Two-fluid or four-fluid type nozzles may be used. The slurry jetted out from the spray nozzle together with compressed gas forms spray comprising minute particles. The particle size of the liquid droplets in the spray can be controlled, for example, by the ratio between the slurry and the compressed gas. By controlling the diameter of the liquid droplets, it is possible to control the particle size of the powder to be ultimately obtained. The liquid contents are dried and removed to obtain the powder by applying heat to remove the moisture during the free fall of the slurry in spray form. This heat may be provided by using a heated gas that is spewed out from the spray nozzle, or the heat can be obtained by supplying heated gas to the spray environment. To dry the slurry, heated gas of 100° C. or more may be applied. The spray and drying process by the spray nozzle is performed in a predetermined chamber. The powder obtained from the spray dry method using the spray nozzle is normally granular powder. The particle size of this granular powder, as explained above, can be controlled by the ratio of slurry and compressed gas, for example, the volume ratio of the slurry to the compressed gas. It is also possible to create small liquid droplets by clashing the slurries against each other.

The sintering process in this invention produces spherical shaped ceramic powder by sintering the granular powder obtained from the spray drying method that uses the spray nozzle. If, for example, the goal is to ultimately obtain barium titanate ($BaTiO_3$) powder, the granular powder may consist of a mixture of $TiO_2$ particles and $BaO$ particles, or only $BaTiO_3$ particles. While the sintering conditions, notably the temperature and time, can be set at one's discretion in accordance with the composition of the ceramics, the sintered powder according to the present invention will be close to 1 in terms of its sphericity because the granular powder obtained from the spray nozzle is close to spherical shape. The particle size of the powder obtained after the sintering process can be controlled because the particle size of the granular powder can be easily controlled. If the spray nozzle is used, fine granular powder of about 1 to 10 μm in particle size can be obtained. When this granular powder is sintered, the particle size will become to be about 1 to 10 μm although there might be a slight shrinkage in the particle size.

The ceramic powder thus obtained in accordance with the present invention is a composite powder created by sintering a plurality of ceramic ingredients. The obtained ceramic powder typically has a mean particle size of about 1 to 50 μm, and a spherical degree of 0.8 or higher.

The spherical shaped ceramic powder in accordance with the present invention is the result of reaction or composite formation of more than one ceramic ingredients through the sintering process. As explained above, this invention uses a spray nozzle to form granular powder. As the slurry to be sprayed from the nozzle can be mixed with a plurality of ceramic ingredients, the granular powder thus obtained will comprise of a combination of plural ceramic ingredients (particles). By sintering granular powder as a combined body of ceramic ingredients (particles), several ceramic ingredients can be obtained as a composite powder due to the sintering process.

The mean particle size of the spherical shaped ceramic powder in accordance with the present invention is about 1 to 50 μm. This is because if the mean particle size is larger than about 50 μm, and the powder is used in a composite material with resin to form a circuit board, the surface of the circuit board becomes rough, making it difficult to form circuits. On the other hand, if the particle size is smaller than about 1 μm, it lowers the kneadability with resin. A preferred mean particle size may be about 1 to 20 μm, and more preferably about 1 to 10 μm.

The sphericity of particles of spherical ceramic powder in accordance with the present invention is 0.8 or higher, or preferably 0.9 or higher, and more preferably be 0.95 or higher. In other words, the spherical shape obtained by the present invention encompasses a concept not only of a perfectly spherical form with a smooth surface but also a polyhedron extremely close to a perfectly spherical form. Here, the "sphericity" is defined by a ratio r/R, where r is a diameter of the smallest circle circumscribing a projected image of a particle, and R is a diameter of a circle having an area equal to that of the projected image of the particle. If the sphericity is 0.8 or higher, it facilitates uniform dispersion of the ceramic powder in the resin material when the powder is used as a composite material dispersed into resin, and lessens the occurrence of cracks that may be caused by lack of uniformity when molded.

Compositions of the spherical ceramics in accordance with the present invention include oxide magnetic materials and oxide dielectric materials mentioned above. However, these compositions do not provide the basis for restricting the present invention because the present invention is applicable regardless of the compositions. Also, while oxide magnetic material and oxide dielectric material are frequently used in the form of composite oxide compound, the present invention is unique in that these composite oxide compounds have a mean particle size of about 1 to 50 μm and a sphericity of 0.8 or higher.

The present invention provides composite materials between the spherical ceramic powder mentioned above and resin material. Methods for manufacturing such composite materials include a molding method in which a mixture of soluble resin and spherical ceramic powder of the present invention is prepared, and then glass cloths are impregnated with the mixture and molded into a substrate, a molding method using the printing method, and a molding method using the dip method. Further, other known methods used widely in the molding of resin, such as a method that uses an injection molding machine to form a mixture of thermoplastic resin and spherical ceramic powder manufactured by the present invention, a transfer molding method and an extrusion method may be used. Conventionally known resins may be used as the resin material.

It is desirable to set the volume of the magnetic or dielectric oxide spherical powder in the composite material at about 30 to 98 wt %. This is because anything less than about 30 wt % would lack magnetic or dielectric characteristics for a composite material. On the other hand, if the volume content exceeds about 98 wt %, molding becomes difficult. While it depends on the characteristics of the resin material to be combined, the volume content of oxide spherical power may preferably be about 40 to 80 wt %, and more preferably be about 50 to 70 wt %.

Figure 1:
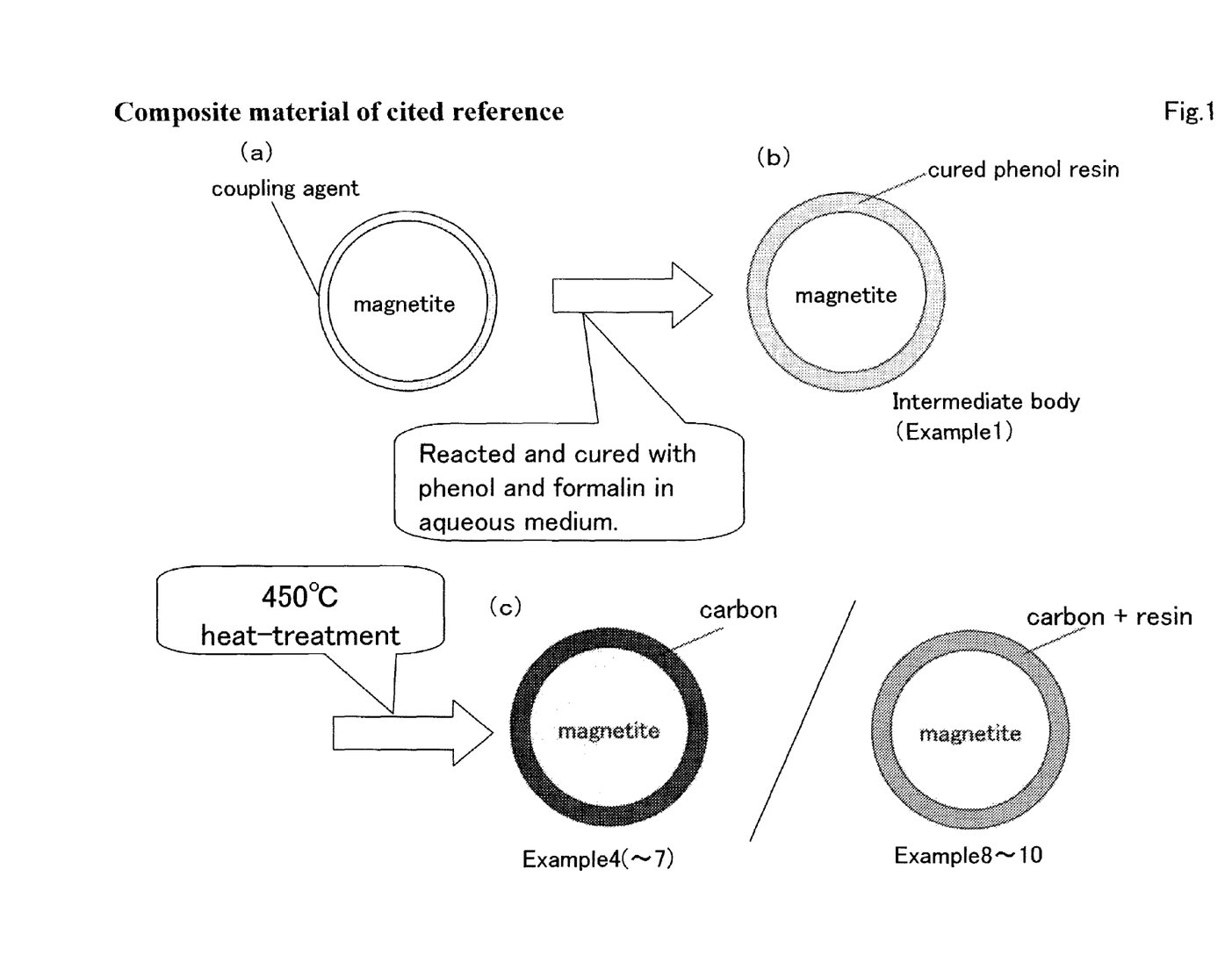
FIG. 1 is a photograph of an SEM image of spherical powder obtained in accordance with the present invention.
Figure 2:
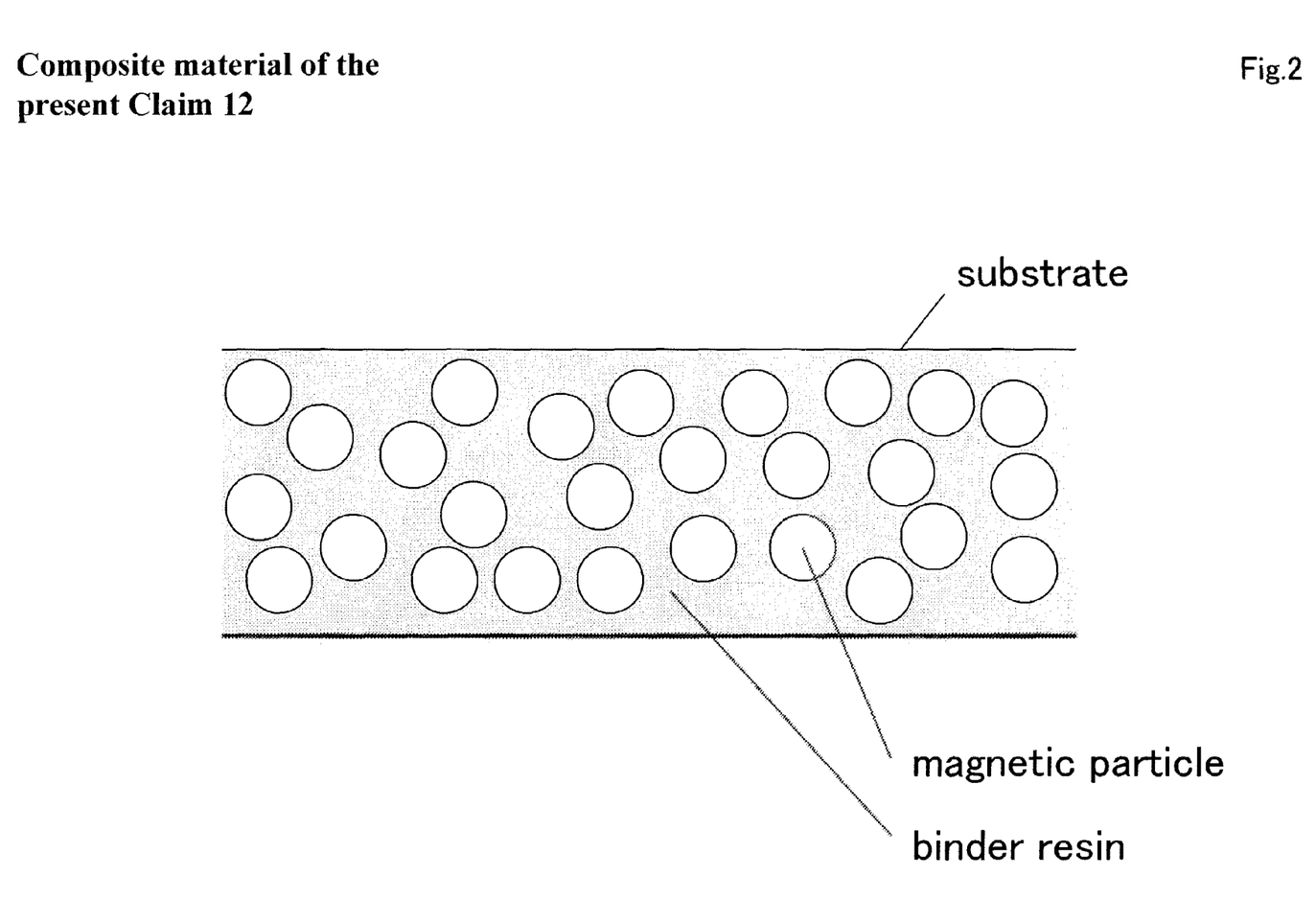
FIG. 2 is a photograph of an SEM image of spherical powder obtained by the conventional pulverizing method.

FIG. 1 shows a microscopic photograph (×3,500) of a particle structure of barium titanate powder (of the present invention) with a sphericity of 0.94. For comparison, FIG. 2 shows a microscopic photograph (×3,500) of a particle structure of barium titanate powder (conventional example) obtained through the pulverizing method. It can easily be seen that, compared with the conventional pulverizing method, the powder obtained by the present invention has powder particles with a higher sphericity. These powders were mixed with organic resin material (vinyl benzyl resin) each at a rate of 40 vol % (76 wt %), and the dielectric constant and quality coefficient (Q) were measured. The results are shown in Table 1. As both powders have the same composition, their characteristics as dielectric material coincide. However, as a composite material, the mixture using the powder obtained by the present invention exhibited superior dielectric constant and quality coefficient (Q).

TABLE 1

|  | Mean Particle Size (μm) | Dielectric Constant (100 MHz) | Q (100 MHz) |
|---|---|---|---|
| Present Invention | 4.3 | 20.5 | 52 |
| Conventional Example | 3.1 | 18.2 | 45 |

The powder obtained from the present invention and power obtained from the conventional pulverizing method were kneaded with thermoplastic resin for injection molding purpose. Kneadability of the mixtures was evaluated based on the torque values measured when they are kneaded in a heating kneader. It can be said that the powder with lower torque has better kneadability and thus has higher filler properties.

The torque value of the powder of the present invention was 70 N·m and that of the powder produced under the conventional pulverizing method was 100 N·m, thus verifying that the powder of the present invention has superior kneadability. It is believed that such a result was obtained because the pulverized powder has square-shaped, and there is a larger frictional resistance between the resin and the particles. If the powder is spherical like the powder of the present invention, the frictional resistance between the powder and resin declines and improves the flowability of the powder within the resin.

Figure 3:
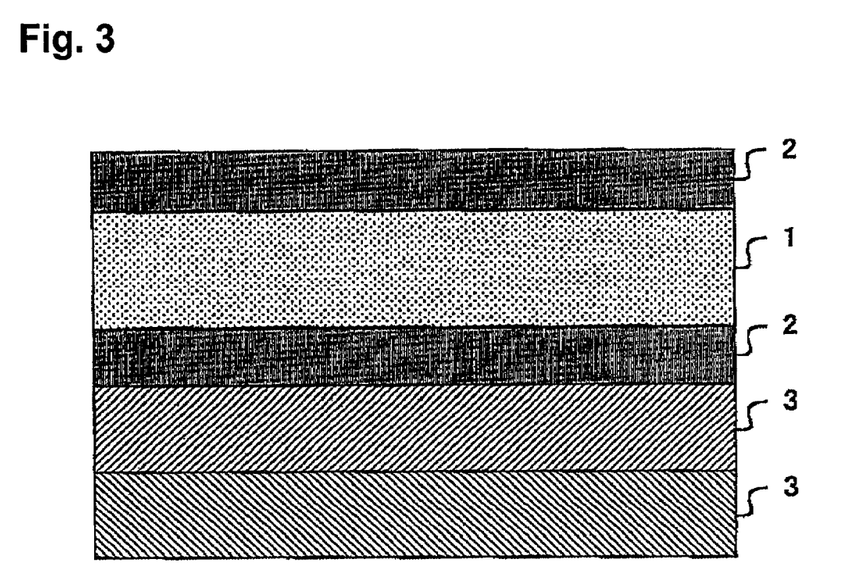
FIG. 3 is a cross-sectional view of an example of specific use of a composite material of the present invention.

FIG. 3 shows an example of specific usage of the composite material of the present invention. FIG. 3 shows a substrate that is formed from a magnetic material layer 1 that is created by dispersing and mixing spherical ferrite powder in resin. The front and rear sides of the magnetic material layer 1 is laminated with a dielectric layer 2 having a relatively low dielectric constant, and then a dielectric layer 3 with relatively strong dielectric constant is laminated on either side of the dielectric layer 2. A laminated substrate can be obtained by forming a conductive pattern comprising ground pattern and wiring pattern at least on one of the front and rear surfaces of this substrate. These dielectric layers 2 and 3 can be formed with the composite material of the present invention. Also, the compound magnetic materials of the present invention may also be used as laminated electronic component materials such as substrate materials using prepregs, chip-type inductance element materials and filters.

With the present invention, the characteristics of ceramic powder are effectively exerted because the filler properties of ceramic powder increases when manufacturing this type of substrate and electronic components.

Also, since the powder rarely includes giant particles as found in pulverized powder, it is possible to reduce the occurrence of defects during product manufacturing. For example, in an ordinary printed substrate manufacturing process that involves coating and impregnating glass cloths with a composite material of varnish containing ceramic powder, there is a possibility that giant particles may enter the gap between the glass cloths and the copper foil if the thickness of the substrate is small, thus causing voids between the copper foil and particles without resin, and moisture may invade the substrate to lower its reliability. This type of problem can be prevented by the powder manufactured by the present invention.

EMBODIMENT EXAMPLES

The present invention will be described below with reference to more specific examples.

Embodiment Example 1

Slurry was prepared by mixing barium oxide (BaO) powder, titanium oxide ($TiO_2$) powder, neodymium ($Nd_2O_3$) powder and manganese oxide (MnO) powder weighed at a weight ratio of 13.8:54.7:31.4:0.1, adding water and mixing them for 12 hours with a ball mill (hereafter referred to as No. 1 slurry). Prior to the mixing, however, a dispersant (A-30SL manufactured by Toa Gosei Co.) was added at a weight percentage of 1% to the powder.

No. 1 slurry was dried and granulized with a spray-type drier. While there are no special restrictions for the spray and drying conditions, it is desirable to set the conditions so that the particle size of the granular powder is less than about 200 μm.

Sintered composite oxide was obtained by sintering the granular powder thus obtained for one hour at 1,250° C. Then, slurry containing powder particles with a mean particle size of about 0.5 μm was prepared by adding water to the sintered oxide and then dispersant agent (A-30SL manufactured by Toa Gosei Co.) at a weight ratio of 1%, and pulverizing the mixture with a ball mill for 48 hour (hereafter referred to as No. 2 slurry). To this No. 2 slurry, a polyvinyl alcohol (PVA) solution diluted to a concentration of 10 wt % was added at a rate of 2 wt % to the total weight of the powder, and adjustments were made so that the powder in the No. 2 slurry would be 40 wt %. The PVS functions as a binding agent.

Granular powder was formed by conducting the spray drying method on the No. 2 slurry. The spray drying apparatus used was the MDL-050 manufactured by Fujisaki Denki Co. Using a four-fluid type nozzle, the spray drying condition was set at solution feeding speed of 40 cc/min., nozzle air volume of 160 NL/min. and gas supply temperature of 190° C. The granular powder, thus obtained, had a mean particle size of about 9.7 μm.

The granular powder was sintered for one hour at 1,300° C. The sintered powder thus obtained was a spherical powder with a mean particle size of about 9 μm. The resultant powder was dielectric barium titanate powder with a sphericity of 0.93.

Next, the powder obtained was kneaded and dispersed in a ball mill by mixing the powder with a fluid form vinyl benzyl resin so the powder would become 40 vol % (78 wt %). After three hours of kneading and dispersing, the dispersed solution was formed into a sheet of 200 μm thick using a doctor blade technique. After drying the sheet, an electrolyte copper foil of 18 μm thick was bonded to each of the front and rear sides of the sheet by using heat and pressure. The sheet thickness excluding the electrolyte copper foils after bonding the copper foils was 100 μm. Also, the portion sandwiched by the electrolyte copper foils becomes the dielectric layer. Circular-shaped disc samples with 10 mm in diameter were punched out of the copper foil-bonded sheet.

Capacitance of the disc shaped samples was measured by using an impedance analyzer (HP4291A manufactured by Agilent Technologies). The dielectric constant was calculated on the basis of the measured results. The results are shown in Table 2 with quality coefficient Q. These results will be explained later. A bending strength test was conducted on the electrolyte copper foil-bonded sheet. As a result, the sheet exhibited a bending strength of 176 Mpa. Since this value is equivalent to that of a composite material produced with an addition of 30 vol % (69 wt %) of conventional pulverized powder, the use of powder of the present invention would enhance the characteristics of the composite material without damaging its mechanical properties.

TABLE 2

|  | Mean Particle Size (μm) | Dielectric Constant (2 GHz) | Q (2 GHz) |
|---|---|---|---|
| Embodiment Example 1 | 9 | 9.88 | 329 |
| Embodiment Example 2 | 3.5 | 9.36 | 318 |
| Comparative Example 1 | 3.5 | 9.32 | 298 |

Embodiment Example 2

For Embodiment Example 2, powder was obtained under the same conditions as Embodiment Example 1 except for the fact that the pulverizing hours with the ball mill was extended to 96 hours in order to obtain the No. 2 slurry. Then, disc shaped samples were obtained.

The mean particle size of the powder comprising the No. 2 slurry following 96 hours of pulverization was about 0. 1 μm. Also, the mean particle size of granular powder obtained from using the spay drying method on the No. 2 slurry was about 4.5 μm. Also, the powder after sintering had a mean particle size of about 3.5 μm and a sphericity of 0.94. Moreover, it was verified that, when the particle size of the powder applied in the spray drying method was made smaller, the particle size of the granular powder would become smaller compared to Embodiment Example 1, Table 2 shows the dielectric ratio and quality coefficient (Q) of Embodiment Example 2 measured in the same way as Embodiment Example 1.

COMPARATIVE EXAMPLE 1

No. 2 slurry was obtained by using the same conditions as Embodiment Example 1, except for the fact that the powder concentration in the slurry was set at 60 wt %.

Using a disc type spray drier, granular powder with a mean particle size of about 87 μm was obtained from the No. 2 Slurry. Since the mean particle size of granular powder obtained from spray drier using a four-fluid type nozzle was about 9.7 μm, it is understandable that finer granular powder can be obtained by a spray drying method using a spray nozzle.

The granular powder, thus obtained, was sintered for one hour at 1,350° C. By pulverizing the sintered powder with a pneumatic pulverizing machine, particles with a mean diameter of about 3.5 μm and a sphericity of about 0.71 were obtained.

This pulverized powder was used to prepare disc shaped samples under the same conditions as Embodiment Example 1. Then, the dielectric ratio and quality coefficient (Q) Comparative Example 1 were obtained just as in the case of Embodiment Example 1. Table 2 shows the results.

When comparing the characteristics of Embodiment Examples 1 and 2 and Comparative Example 1 shown in Table 2, it is clearly seen that the dielectric constant and quality coefficient (Q) of Embodiment Example 2 and Embodiment Example 1 are superior to those of Comparative Example 1. In this manner, it can be surmised that the reason why the dielectric constant and quality coefficient (Q) of Embodiment Examples 1 and 2 had increased was because there was an enhancement of filler and dispersion properties toward the resin due to the fact that the ceramic powder obtained from Embodiment Examples 1 and 2 were closer to a true sphere.

COMPARATIVE EXAMPLE 2

No. 2 slurry consisting of powder with a mean particle size of about 0.5 μm was obtained by using the same conditions as Embodiment Example 1.

Granular powder was obtained from the No. 2 slurry by using a disc-type spray drier. The mean particle size of the granular powder was 86 μm. When this granular powder was observed for its particle structure, it was learned that the center was either hollow or crushed. In order to obtain small sized granular powder by the spray drier method, it is necessary to make the sprayed liquid droplets smaller. However, in the disc type spray drier, it is believed that granular powder consisted of large-diameter particles because of the difficulty in creating fine liquid droplets. Conversely, if the spray nozzle type of spray drier in Embodiment Examples 1 and 2 is used, minute liquid droplets can be obtained. As a result, it is possible to obtain granular powder with particle size smaller than the powder obtained with the disc type spray drier.

Embodiment Example 3

Slurry was obtained by adding water to a mixture of raw material powder at a mole ratio of 49:23:28 for iron oxide ($Fe_2O_3$):Nickel oxide (NiO) and Zinc oxide (ZnO), and the mixture was mixed for 12 hours in a ball mill. Prior to the mixing, a dispersant (A-30SL manufacture by Toa Gosei Co.) was added at a ratio of 1% to the weight of the powder.

Thereafter, granular powder with a mean particle size of 10.3 μm was obtained by using the same process as that of Embodiment Example 1. By sintering the granular power for one hour at 1,150° C., spherical sintered powder was obtained. The mean particle size of this powder was about 8.5 μm and the sphericity was about 0.95. This powder is magnetic ferrite powder (spherical ceramic powder.)

Epoxy resin was mixed with the magnetic ferrite powder so that the powder volume will be 40 vol % (75 wt %).

The epoxy resin contained epi-bis type epoxy resins (Epikote 1001 and Epikote 1007 manufactured by Yuka Shell Epoxy K.K.) as polyfunctional epoxy resins at a ratio of 26.9 wt % each, 23.1 wt % of bisphenol A type high molecular weight epoxy resin (Epikote 1225 manufactured by Yuka Shell Epoxy K.K.), and 23.1 wt % of tetraphenylol-ethane type epoxy resin (Epikote 1031S manufactured by Yuka Shell Epoxy K.K.) as an epoxy resin having a special skeleton, which were mixed as the main ingredients. Bisphenol A type novolac resin (YLF129B65 manufactured by Yuka Shell Epoxy K.K.) as a curing agent and an imidazole compound (2E4MZ manufactured by Shikoku Chemicals K.K.) as a curing accelerator were added to the epoxy resin.

A mixed solution of toluene and methyl ethyl ketone was added to the mixture of the magnetic ferrite powder and epoxy resin, and they were mixed and dispersed in a ball mill for five hours. As a result, a solution the magnetic ferrite powder dispersed therein was obtained. The dispersed solution was formed into a sheet of 100 μm thick by a doctor blade method.

A composite magnetic substrate of about 0.4 mm in thickness was obtained by alternately laminating the 100 μm sheets and glass cloths of 60 μm thick, and then applying heat and pressure to the laminated body. Table 3 shows the measurement results for magnetic permeability and quality coefficient (Q) for the composite magnetic substrate.

Table 3 also shows the measurement results of the composite magnetic substrate (Comparative Example) obtained by using magnetic ferrite powder (irregular shape) of the same composition (with a mean particle size of 5.2 micrometer) obtained through the pulverizing method. Compared to the composite magnetic substrate of the comparative example, both the magnetic permeability and quality coefficient (Q) of the composite magnetic substrate of this Embodiment Example are higher.

While the explanation is made as to a composite magnetic substrate, in accordance with an embodiment of the present invention, in which glass cloths are alternately laminated, the composite magnetic substrate of the present invention is not limited to this particular embodiment.

TABLE 3

|  | Dielectric Constant (100 MHz) | Q (100 MHz) |
| --- | --- | --- |
| Embodiment Example 3 | 4.5 | 13 |
| Comparative Example | 3.5 | 10 |

Embodiment Example 4

Using the magnetic ferrite powder obtained in Embodiment Example 3, a compressed powdered magnetic body was formed, and its magnetic characteristics were measured.

Figure 4:
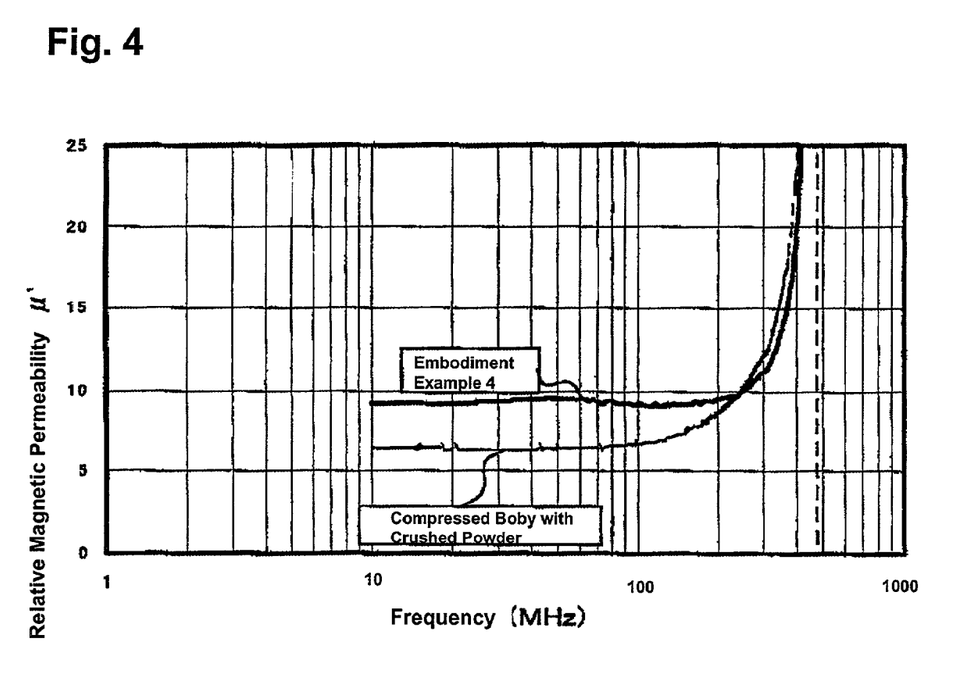
FIG. 4 is a graph showing the frequency characteristics of magnetic permeability in Embodiment Example 3.

The magnetic ferrite powder obtained from Embodiment Example 3 was mixed with the same epoxy resin used in Embodiment Example 3 at 97 wt % to the epoxy resin, and a compressed powder magnetic body was formed by compression in a metal die with an outer diameter of 7 mm and an inner diameter of 3 mm and at a temperature of 180° C. and a pressure of 5 ton/ cm$^2$. The frequency characteristics of the magnetic permeability ($\mu'$) of the compressed magnetic body were measured. The results are shown in FIG. 4. FIG. 4 also shows the frequency characteristics of magnetic permeability ($\mu'$) of a compressed powdered magnetic body obtained similarly to this Embodiment Example using the powder with a mean particle size of 2 µm obtained from the pulverizing method used in Embodiment Example 3. As shown in FIG. 4, it is evident that the frequency characteristics of the magnetic permeability of the compressed magnetic body obtained from this Embodiment Example is excellent.

As explained above, the present invention provides spherical ceramic powder with particle sizes that are suited for combining with resin materials. Moreover, the present invention provides spherical ceramic powder with excellent dispersion and filler characteristics against resins. The present invention also provides the method for manufacturing such ceramic powder. Moreover, the present invention provides composite materials between the spherical ceramic powders and resin materials.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A composite material comprising oxide spherical shape powder composed of dielectric material and a binder resin that has the oxide spherical powder dispersed and retained within, wherein the oxide spherical powder consists essentially of particles with a mean particle size of about 1 to 50 µm and a sphericity of 0.8 or higher, wherein the dielectric material comprises at least one material selected from the group consisting of barium titanate-neodymium ceramics, barium titanate-tin ceramics, lead-calcium ceramics, titanium dioxide ceramics, barium titanate ceramics, lead titanate ceramics, strontium titanate ceramics, calcium titanate ceramics, bismuth titanate ceramics, magnesium titanate ceramics, CaWO$_4$ ceramics, Ba (Mg, Nb) O$_3$ ceramics, Ba (Mg, Ta) O$_3$ ceramics, Ba (Co, Mg, Nb) O$_3$ ceramics and Ba (Co, Mg, Ta) O$_3$ ceramics.

2. A composite material according to claim 1, wherein the oxide spherical powder is contained in the range of about 30 to 98 wt %.

3. A composite material comprising oxide spherical shape powder composed of dielectric material and a binder resin that has the oxide spherical powder dispersed and retained within, wherein the oxide spherical powder consists essentially of particles with a mean particle size of about 1 to 50 µm and a sphericity of 0.8 or higher, and the oxide spherical powder is a composite powder created by sintering a plurality of ceramic ingredients, wherein the dielectric material comprises at least one material selected from the group consisting of barium titanate-neodymium ceramics, barium titanate-tin ceramics, lead-calcium ceramics, titanium dioxide ceramics, barium titanate ceramics, lead titanate ceramics, strontium titanate ceramics, calcium titanate ceramics, bismuth titanate ceramics, magnesium titanate ceramics, CaWO$_4$ ceramics, Ba (Mg, Nb) O$_3$ ceramics, Ba (Mg, Ta) O$_3$ ceramics, Ba (Co, Mg, Nb) O$_3$ ceramics and Ba (Co, Mg, Ta) O$_3$ ceramics.

4. The composite material according to claim 1, wherein the binder resin is a thermoplastic resin.

5. The composite material according to claim 1, wherein the binder resin is a vinyl benzyl resin.

6. The composite material according to claim 1, wherein the oxide spherical powder is contained in the range of about 30 to 75 wt %.

7. The composite material according to claim 1, wherein the oxide spherical powder consists essentially of particles with a mean particle size of about 1 to 20 µm.

8. The composite material according to claim 1, wherein the oxide spherical powder consists essentially of particles with a mean particle size of about 1 to 10 µm.

9. The composite material according to claim 3, wherein the binder resin is a thermoplastic resin.

10. The composite material according to claim 3, wherein the binder resin is a vinyl benzyl resin.

11. The composite material according to claim 3, wherein the oxide spherical powder is contained in the range of about 30 to 75 wt %.

12. The composite material according to claim 3, wherein the oxide spherical powder consists essentially of particles with a mean particle size of about 1 to 20 µm.

13. The composite material according to claim 3, wherein the oxide spherical powder consists essentially of particles with a mean particle size of about 1 to 10 µm.

* * * * *